United States Patent [19]
Miyauchi et al.

[11] Patent Number: 5,761,011
[45] Date of Patent: Jun. 2, 1998

[54] MAGNETIC HEAD HAVING A MAGNETIC SHIELD FILM WITH A LOWER SATURATION MAGNETIZATION THAN A MAGNETIC FIELD RESPONSE FILM OF AN MR ELEMENT

[75] Inventors: Daisuke Miyauchi, Tokyo; Tetsuya Mino, Funabashi, both of Japan

[73] Assignee: TDK Corporation, Tokyo, Japan

[21] Appl. No.: 829,286

[22] Filed: Mar. 31, 1997

[30] Foreign Application Priority Data

| Apr. 1, 1996 | [JP] | Japan | 8-079144 |
| Mar. 7, 1997 | [JP] | Japan | 9-053066 |

[51] Int. Cl.$^6$ ............................................. G11B 5/39
[52] U.S. Cl. ............................................. 360/113
[58] Field of Search ............................................. 360/113

[56] References Cited

U.S. PATENT DOCUMENTS 5,528,440  6/1996  Fontana et al.

FOREIGN PATENT DOCUMENTS

| 61-258323 | 11/1986 | Japan |
| 2-116009 | 4/1990 | Japan |
| 4-358310 | 12/1992 | Japan |
| 5-174334 | 7/1993 | Japan |

OTHER PUBLICATIONS

B. Dieny et al., "Giant Magnetoresistance In Soft Ferromagnetic Multilayers", Physical Review B, vol. 43, No. 1, Jan. 1, 1991, pp. 1297 to 1300.

B. Dieny et al., "Magnetotransport Properties of Magnetically Soft Spin–Valve Structures (Invited)", Journal Of Applied Physics, vol. 69, No. 8, Apr. 15, 1991, pp. 4774 to 4779.

Primary Examiner—A. J. Heinz
Attorney, Agent, or Firm—Oblon, Spivak, McClelland, Maier & Neustadt, P.C.

[57] ABSTRACT

An MR element includes a magnetoresistive film, a first magnetic shield film and a second magnetic shield film. The MR film includes at least one magnetic field response film, which responds to an external magnetic field. The first magnetic shield film and the second magnetic shield film are positioned at the two sides of the MR film. The first magnetic shield film includes a magnetic film, whose saturation magnetization is lower than the saturation magnetization of the magnetic field response film. The magnetic film occupies a position that is close to the magnetic field response film.

21 Claims, 9 Drawing Sheets

MAGNETIC HEAD HAVING A MAGNETIC SHIELD FILM WITH A LOWER SATURATION MAGNETIZATION THAN A MAGNETIC FIELD RESPONSE FILM OF AN MR ELEMENT

BACKGROUND OF THE INVENTION

1. Field of the Invention

The present invention relates to a magnetic head which is employed in a magnetic disk apparatus.

2. Discussion of the Background

A great deal of interest has been focused on magnetic heads which utilize the magnetoresistance effect, since their output voltage does not rely on the speed of the recording medium and a high output is achieved. Normally, in a magnetic head, a second magnetic shield film and a first magnetic shield film are provided above and below a magnetoresistive (MR) element via an insulating layer. These magnetic shield films absorb superfluous magnetic flux, improve the resolution and the high frequency characteristics and increase the recording density.

Magnetic shield films are constituted of a material with a high permeability and a high saturation magnetization. Therefore, Ni-Fe alloys with a low coercivity and a low magnetostrictive force are often used.

Japanese Unexamined Patent Publication (KOKAI) No. 116009/1990 discloses a manufacturing method in which an Fe-Al-Si alloy is employed to constitute the first magnetic shield film. An Fe-Al-Si alloy film has characteristics such as a high permeability, a high saturation magnetization and a high degree of hardness. In addition, among amorphous soft magnetic materials, Co metal group amorphous materials such as Co-Zr, for instance, are known to demonstrate a high permeability. For instance, Japanese Unexamined Patent Publication (KOKAI) No. 258323/1986 discloses an example in which a soft magnetic laminated film constituted by laminating a Co-Zr amorphous alloy and a Ni-Fe alloy is used to constitute a magnetic shield film.

Japanese Unexamined Patent Publication (KOKAI) No. 174334/1993 discloses a magnetic shield film which is characterized by the fact that its permeability is smaller than that of the MR film. If a shield material with a high permeability is used, since the magnetic shield film would absorb the magnetic flux which should normally be taken in by the MR film, the reproduction sensitivity is reduced. The magnetic shield film disclosed in the publication constitutes a means for preventing this, and it is constituted by using a Co-Zr-Cr alloy.

Now, as magnetic disk apparatuses have become more and more compact, it is required of the magnetic head that the track width and the gap between the upper and lower shields be reduced so that a higher recording density can be supported. In addition, when the track width is reduced, since the output voltage is also reduced as a result, it becomes necessary to provide a higher degree of sensitivity in the MR element.

Anisotropic magnetic thin films constituted of Ni-Fe alloys or Ni-Co alloys have been used to constitute an MR film.

However, as a means for supporting a higher degree of sensitivity in the MR element and a higher output, a magnetic multilayer film constituted by laminating magnetic film and non-magnetic film, which provides a high degree of magnetoresistance effect, has been attracting much interest. Among magnetic multilayer films, particularly keen interest has been focused on spin valve films because of their high degree of reproduction sensitivity. Publications in the known art that refer to spin valve film include, for instance, Physical Review B Volume 43, page 1297, 1991, Journal of Applied Physics, Volume 69, page 4, 774, 1991 and Japanese Unexamined Patent Publication (KOKAI) No. 358310/1992.

A spin valve film normally has a film structure comprising NiFe/Cu/(NiFe or Co)/FeMn. In a spin valve film, while the magnetization of the pinned ferromagnetic layer, which is in contact with the anti-ferromagnetic layer is pinned, the magnetization of the free ferromagnetic layer rotates freely under the influence of an external magnetic field, which achieves an anti-parallel state of magnetization and results in a high degree of magnetoresistance effect.

As explained above, as a means for supporting higher magnetic density, efforts have been made to reduce the gap between the upper and lower shields and the track width in a magnetic head. However, a narrower gap between the shields means that the distance between the MR element and the shields is reduced and that the influence of the magnetic characteristics of the magnetic shield films on the reproduction sensitivity and the reproduction waveform of the MR element can no longer be disregarded. This problem becomes even more pronounced as the recording density increases and the insulating layer becomes thinner.

In particular, in the case of the spin valve film described above, the film thickness of the magnetic field response film, which responds to an external magnetic field, is smaller than that of a regular anisotropic magnetoresistive film and, consequently, the influence of the static magnetic fields of the magnetic shield films also becomes significant. Since no magnetic domain control is implemented on the magnetic shield films, the magnetic fields applied by the magnetic shield films adversely affect the stability of the reproduction waveform.

SUMMARY OF THE INVENTION

It is an object of the present invention to provide an MR magnetic head that achieves an improvement in recording density by absorbing superfluous magnetic flux and improving the resolution and the high frequency characteristics.

It is a further object of the present invention to provide an MR magnetic head with which a high output voltage is achieved by preventing deterioration in the reproduction sensitivity due to the influence of the magnetic shield films.

In order to achieve the objects described above, the magnetic head according to the present invention includes a magnetoresistance effect type magnetic conversion element (hereafter referred to as an MR element). The MR element comprises a magnetoresistive film (hereafter referred to as an MR film), a first magnetic shield film and a second magnetic shield film. The MR film includes at least one magnetic field response film that responds to an external magnetic field. The first magnetic shield film and the second magnetic shield film are provided at either side of the magnetic field response film.

At least either the first magnetic shield film or the second magnetic shield film includes a magnetic film whose saturation magnetization is lower than the saturation magnetization of the magnetic field response film. In the magnetic shield film, the magnetic film occupies a position that is close to the magnetic field response film.

As described above, since the first magnetic shield film and the second magnetic shield film are provided at either side of the MR film, superfluous magnetic flux can be absorbed by the first magnetic shield film and the second magnetic shield film to improve the resolution and the high frequency characteristics, thereby achieving an improvement in the recording density.

At least either the first magnetic shield film or the second magnetic shield film, i. e., the first magnetic shield film, for instance, includes a magnetic film whose saturation magnetization is lower than the saturation magnetization of the magnetic field response film that is included in the MR film. In the magnetic shield film, the magnetic film occupies a position that is close to the magnetic field response film. In such a structure, any deterioration in the reproduction sensitivity of the magnetic head due to the influence of the first magnetic shield film is prevented, to improve the output voltage.

The magnetic film whose saturation magnetization is lower than the saturation magnetization of the magnetic field response film included in the MR film may be provided at either the first magnetic shield film or the second magnetic shield film, or at both of them.

The magnetic field response film is constituted of an anisotropic magnetic film in the case of an anisotropic MR element, and is constituted of a magnetic film (free-layer) whose magnetization rotates under the influence of an external magnetic field in the case of a GMR film such as a spin valve film.

In addition, in a combined type magnetic head that employs an MR element for a read element and an inductive element for a write element, the structure in which a second magnetic shield film is positioned toward the side where the inductive element is provided and a first magnetic shield film is positioned toward the opposite side is normally adopted. In such a structure, the saturation magnetization of the first magnetic shield film is set smaller than the saturation magnetization of the magnetic field response film. This structure achieves an improvement in the output voltage by preventing deterioration in the reproduction sensitivity of the magnetic head due to the influence of the first magnetic shield film within a range over which the characteristics of the inductive element are not affected. The second magnetic shield film positioned toward the side where the inductive element is provided is normally constituted of the first magnetic film of the inductive element.

An effective implementation of the first magnetic shield film may have a multilayer film structure in which two magnetic films are separated from each other by a non-magnetic film. In that case, the saturation magnetization of the magnetic film that is positioned closer to the magnetic field response film is set smaller than the saturation magnetization of the magnetic field response film. The saturation magnetization of the magnetic film that is further away from the magnetic field response film may be either smaller or larger than the saturation magnetization of the magnetic field response film.

BRIEF DESCRIPTION OF THE DRAWINGS

These and other advantages, features and objects of the present invention will be understood by those of ordinary skill in the art referring to the annexed drawings, given purely by way of non-limitive example, in which.

DETAILED DESCRIPTION OF THE PREFERRED EMBODIMENTS

Figure 1:
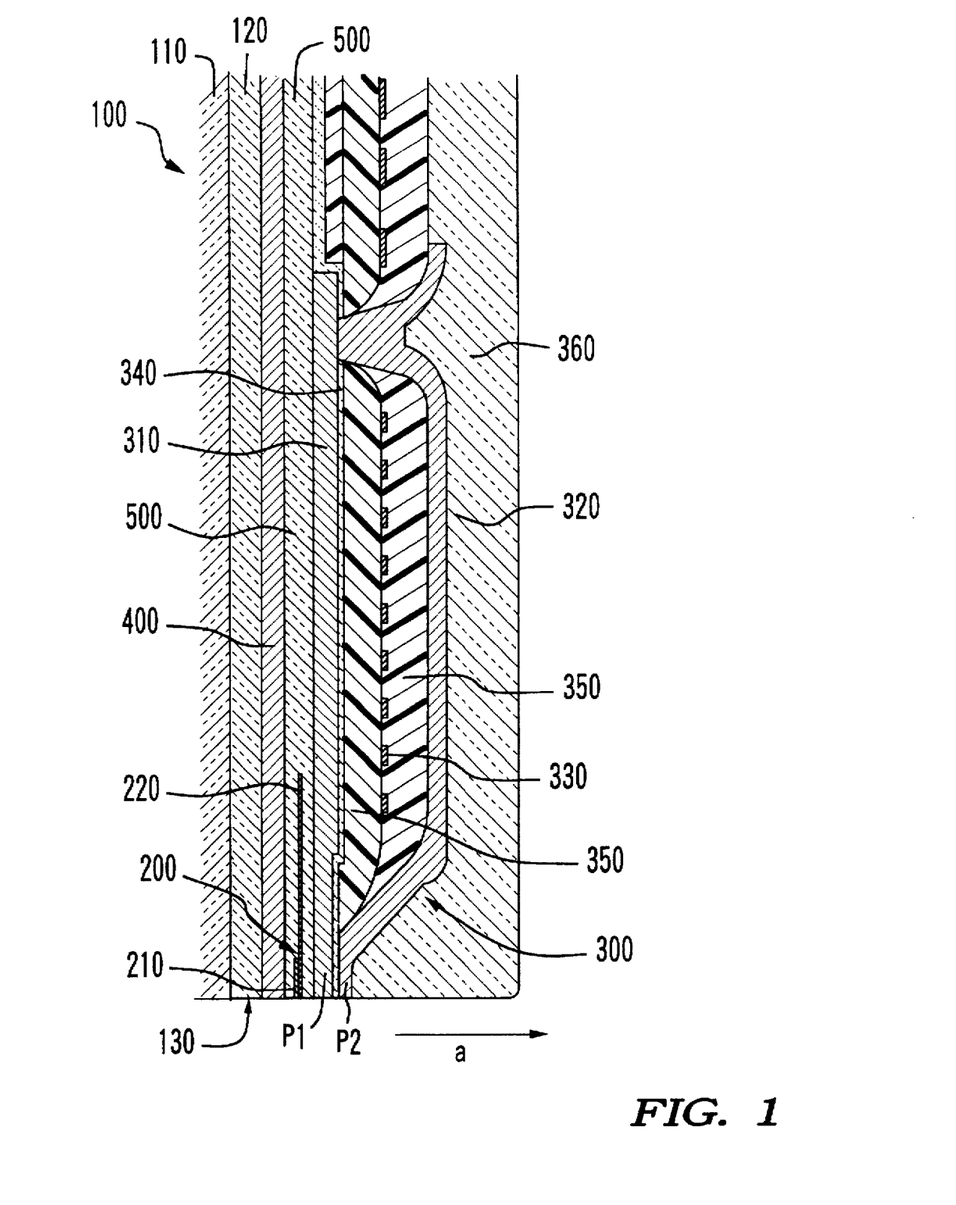
FIG. 1 is a cross section of the magnetic head according to the present invention.

Referring to FIG. 1, the thin film magnetic head is provided with an MR element 200 that is used as a read element and an inductive element 300 that is used as a write element, on a slider 100.

The slider 100 is constituted of a ceramic structure, and an insulating film 120 constituted of $Al_2O_3$, $SiO_2$ or the like is provided on the base body 110 constituted of $Al_2O_3$-TiC or the like. The slider 100 is provided with an air bearing surface (hereafter referred to as the ABS surface) 130 at one surface, which faces opposite the magnetic disk. Sliders 100 in the known art include a type in which a rail portion is provided at the surface that faces opposite the magnetic disk with the surface of the rail portion constituting the ABS surface, a type in which the surface facing opposite the magnetic disk is a flat surface without a rail portion, with almost the entire surface constituting the ABS surface, and the like. The arrow (a) indicates the direction in which air flows out.

A first magnetic shield film 400 is laminated onto the insulating film 120, and an insulating film 500 is laminated onto the first magnetic shield film 400. The insulating film 500 is constituted of $Al_2O_3$, $SiO_2$ or the like.

The MR element 200 is provided embedded in the insulating film 500. The MR element 200 is provided with an MR film 210 and a lead conductor 220.

In this structure, the first magnetic shield film 400, which is positioned under the MR element 200 provided with the MR film 210, should be constituted of a low saturation magnetization material whose saturation magnetization is lower than the saturation magnetization of the MR film 210. By using such a material with a low saturation magnetization, it is possible to increase the reproduction sensitivity of the magnetic head with the influence applied by the first magnetic shield film 400, which, in turn, achieves an improvement in the output voltage.

The inductive element 300, which is provided with a first magnetic film 310, a second magnetic film 320, a coil film 330, a gap film 340 that may be constituted of alumina or the like, an insulating film 350 constituted of an organic resin such as Novolak resin, and a protective film 360 and the like, is laminated onto the insulating film 500. In the embodiment shown in FIG. 1, in which the inductive element 300 is laminated onto the MR element 200, the first magnetic film 310 is referred to as a lower magnetic film and the second magnetic film 320 is referred to as an upper magnetic film under normal circumstances. The front end portions of the first magnetic film 310 and the second magnetic film 320 constitute pole tips P1 and P2 that face opposite each other over the gap film 340, whose thickness is very small, and write is performed at the pole tips P1 and P2.

The first magnetic film 310 functions as a second magnetic shield film for the MR element 200. The yolked portions of the first magnetic film 310 and the second magnetic film 320 are linked with each other so that they complete a magnetic circuit at the back gap portion which is on the opposite side from the pole tips P1 and P2. The coil film 330 is formed on the insulating film 350 in such a manner that it winds around the area where the yolked portions are linked in a coil.

Figure 2:
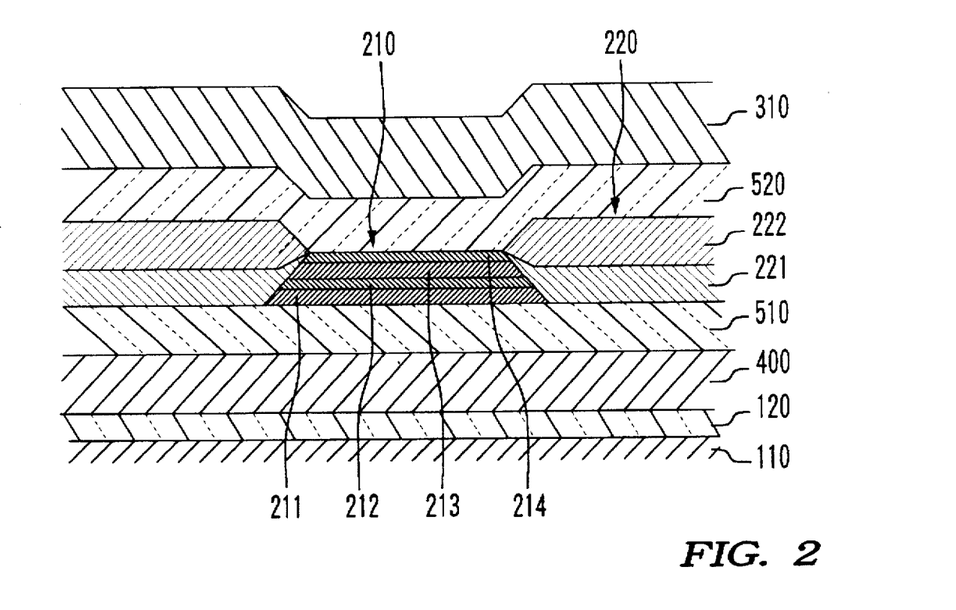
FIG. 2 is an enlarged cross section showing in detail the structure of an MR element which may be included in the magnetic head shown in FIG. 1.

FIG. 2 is an enlarged cross section showing the structure of the MR element 200 included in the thin film magnetic head shown in FIG. 1 in further detail. The first magnetic shield film 400, an insulating film 510, the MR element 200, an insulating film 520 and the second magnetic shield film (first magnetic film) 310 are sequentially laminated on the base insulating film 120 which is laminated onto the base body 110.

The MR film 210, which constitutes the MR element 200, may be constituted by using an anisotropic magnetoresistive film, but it is more desirable to constitute it with a spin valve film. The MR film 210 in the figure is constituted of a spin valve film. The spin valve film in the figure includes a magnetic field response film (first ferromagnetic film) 211, a non-magnetic film 212, a pinned ferromagnetic film (second ferromagnetic film) 213 and an anti-ferromagnetic film 214. It goes without saying that a film structure other than the film structure described above may be adopted for the spin valve film.

The MR film 210 constituted of the spin valve film is formed to have a track width of, for instance, 2.5 μm, and is provided with a lead conductor 220 at each end. The lead conductors 220 are each provided with a Co-Pt alloy film 221 and an electrode film 222. The Co-Pt alloy film 221 is provided to impart magnetic domain control on the magnetic field response film 211 of the spin valve film by applying a bias magnetic field to the spin valve film.

The spin valve film in the figure has the following specific film structure. First, the magnetic field response film 211 is constituted of a NiFe film with a film thickness of approximately 0.1 μm. Under the magnetic field response film 211, a base film constituted of a Ta film with a film thickness of approximately 0.05 μm is formed. The non magnetic film 212 is a Cu film with a film thickness of approximately 0.025 μm. The pinned ferromagnetic film 213 is constituted of a NiFe film with a film thickness of approximately 0.05 μm. The anti-ferromagnetic film 214 is constituted of a FeMn film with a film thickness of approximately 0.1 μm and is provided with a protective film constituted of a Ta film with a film thickness of approximately 0.05 μm. However, this film structure with the specific values for the individual film thicknesses is given purely by way of example and does not impose any restrictions upon the film structure or film thicknesses, and another film structure may be employed.

When the present invention is adopted in the MR film 210 provided with the spin valve film described above, the first magnetic shield film 400 is constituted of a material whose saturation magnetization is lower than the saturation magnetization of the magnetic field response film 211. In the case of the embodiment, since the magnetic field response film 211 is constituted of an NiFe film, a Ni-Fe-Ta alloy whose saturation magnetization is lower than that of the Ni-Fe alloy is used to constitute the first magnetic shield film 400. Instead of Ta, one of the other elements such as Cr, Hf, Rh and the like may be used.

As described above, by using a low saturation magnetization material to constitute the first magnetic shield film 400, it becomes possible to reduce the influence of the static magnetic field applied by the first magnetic shield film 400 to the magnetic field response film 211 to prevent the reversal of magnetization of the magnetic field response film 211 from attenuating, thereby avoiding a reduction in the sensitivity, in the spin valve film in which the insulating layer 510 is thin and the magnetic field response film 211 is also thin. If, on the other hand, a high saturation magnetization material whose saturation magnetization is higher than the saturation magnetization of the magnetic field response film 211 were used to constitute the first magnetic shield film 400, the influence of the static magnetic field applied by the first magnetic shield film 400 to the magnetic field response film 211 would be great enough to attenuate the reversal of magnetization of the magnetic field response film 211, resulting in a reduction in the sensitivity.

As described in Japanese Unexamined Patent Publication (KOKAI) No. 174334/1993, if the permeability and the saturation magnetization of the first magnetic shield film 400 are excessively high, the magnetic flux that should otherwise be taken into the MR film 210 will also be absorbed by the magnetic shield film, reducing the sensitivity.

However, if the permeability is reduced to a considerable extent, its function as a magnetic shield film will not be fulfilled sufficiently, resulting in an increase in the PW50 of the output reproduction wave. Thus, a material with a composition such that the permeability is relatively high, whereas the saturation magnetization is low, is used to constitute the first magnetic shield 400. While an alloy with the composition described earlier is employed in this embodiment, its composition is not limited to this and a Ni-Fe metal alloy such as Ni-Fe-Cr, Ni-Fe-Hf, Ni-Fe-Nb, Ni-Fe-Rh or the like, a Co-metal amorphous alloy such as a Co-Zr-Mo, Co-Zr-Nb or the like may be employed.

The second magnetic shield film 310, which also constitutes the first magnetic film of the inductive element 300 may be constituted of a Ni-Fe alloy, as is used in the prior art. As a result, the output voltage can be improved by preventing deterioration in the reproduction sensitivity of the magnetic head due to the influence of the first magnetic shield film 400 within a range over which the characteristics of the inductive element 300 are not affected.

The film thicknesses of the magnetic shield films may be set at, for instance, approximately 1 µm for the first magnetic shield film 400 and approximately 2.5 µm for the second magnetic shield film (first magnetic film) 310. The film thicknesses of the insulating films 510 and 520 may be set at approximately 1.2 µm for the insulating film 510 between the first magnetic shield film 400 and the MR film 210 and at approximately 1 µm for the insulating film 520 between the MR film and the second magnetic shield film. However, these numerical values are given only by way of example and no restrictions whatsoever are imposed by them.

Figure 3:
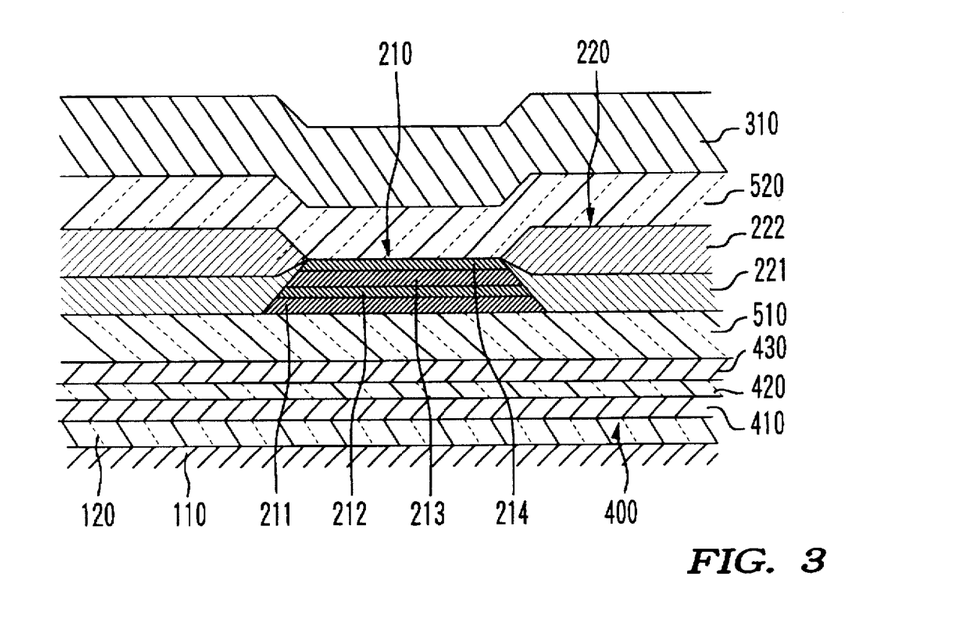
FIG. 3 is an enlarged cross section showing another example of an MR element which may be included in the magnetic head shown in FIG. 1.

FIG. 3 is a cross section showing another embodiment of the magnetic head according to the present invention. The first magnetic shield film 400 includes a first magnetic film 410, a non-magnetic film 420 and a second magnetic film 430. The magnetic film 410 and the magnetic film 430 are separated from each other by the non-magnetic film 420. Of the magnetic films 410 and 430, the magnetic film 430, which is closer to the magnetic field response field 211, has a saturation magnetization that is lower than the saturation magnetization of the magnetic field response film 211. The saturation magnetization of the magnetic film 410 may be either smaller or larger than the saturation magnetization of the magnetic field response film 211.

Specific examples of the first magnetic film 410/non-magnetic film 420/second magnetic film 430 include a laminated film constituted of a Ni-Fe-Ta alloy/Ta/Ni-Fe-Ta alloy and a laminated film constituted of a Ni-Fe-Ta alloy/Ta/Fe-Al-Si alloy. The Fe-Al-Si alloy is a material that is normally used to constitute a lower shield and its permeability and saturation magnetization are both larger than those of a Ni-Fe alloy. The Ni-Fe-Ta alloy is employed because of its low saturation magnetization. To constitute the non-magnetic film 420, Cr or the like may be used in place of Ta.

The first magnetic shield film 400 is constituted as a two-layer structure comprising the first magnetic film 410 and the second magnetic film 430 in order to reduce the magnetic field applied by the first magnetic shield film 400 by inducing magnetic coupling between the two layers, i. e., the first magnetic film 410 and the second magnetic film 430.

Since magnetic domain control is not implemented on the first magnetic shield film 400 itself, its magnetization behavior may become a source of noise. In the embodiment, the first magnetic shield film 400 and the MR film 210 are adjacent to each other via the insulating film 510. Therefore, if the MR film 210 is subjected to the influence of the magnetic field applied by the first magnetic shield film 400, the stability of the output reproduction waveform becomes considerably deteriorated, resulting in an increase in noise.

By constituting the first magnetic shield film 400 with the non-magnetic film 420 and the two layers, i. e., the first magnetic film 410 and the second magnetic film 430, which are laminated at the two sides of the non-magnetic film 420, magnetic coupling is induced between the first magnetic film 410 and the second magnetic film 430. Thus, the problem discussed above is solved. The film thicknesses of the first magnetic film 410 and the second magnetic film 430 are both at approximately 0.5 µm and the film thickness of the non-magnetic film 420 is set at approximately 0.3 µm. There may be more than one set of this combination of the first magnetic film 410, the second magnetic film 430 and the non-magnetic film 420.

Figure 4:
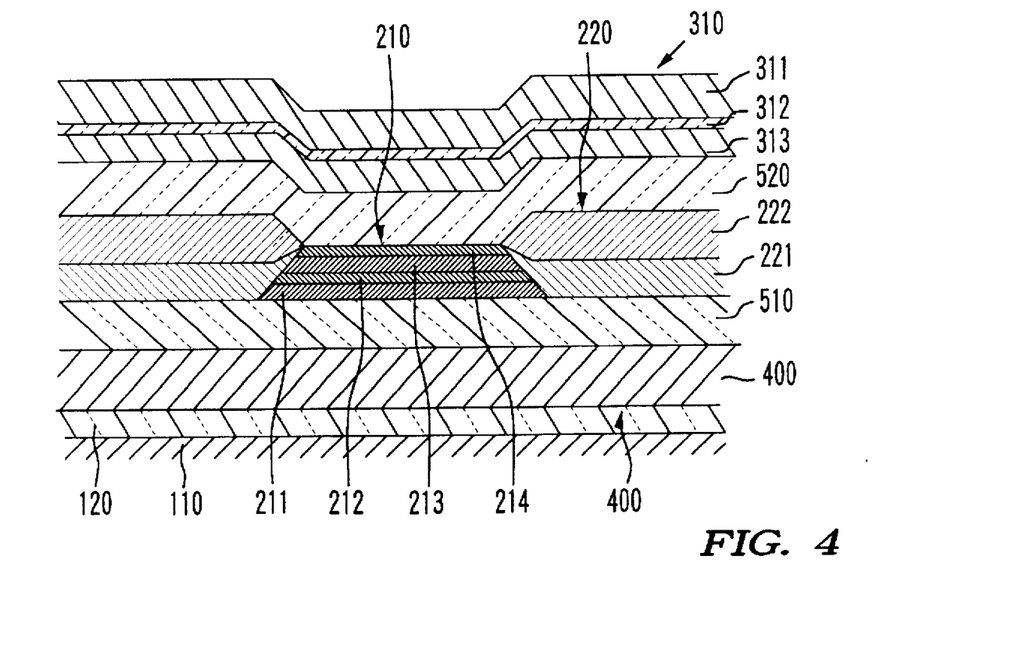
FIG. 4 is an enlarged cross section showing yet another example of an MR element which may be included in the magnetic head shown in FIG. 1.

FIG. 4 is a cross section showing another embodiment of the magnetic head according to the present invention. In the figure, the same reference numbers are assigned to components identical to those in FIGS. 1 to 3 and their explanation is omitted. This embodiment is characterized in that the second magnetic shield film 310 constituting the first magnetic film (lower magnetic film) of the inductive element 300 includes a magnetic film 311, a non-magnetic film 312 and a magnetic film 313 and that the magnetic film 311 and the magnetic film 313 are separated from each other by the non-magnetic film 312. Of the magnetic films 311 and 313, the magnetic film 313, which is closer to the magnetic field response film 211, has a saturation magnetization that is lower than the saturation magnetization of the magnetic field response film 211. It is desirable to set the saturation magnetization of the first magnetic shield film 400 smaller than the saturation magnetization of the magnetic field response film 211.

In this embodiment, too, the advantages that are listed in reference to FIG. 3 with respect to the second magnetic shield film 310 (lower magnetic film) are achieved.

Figure 5:
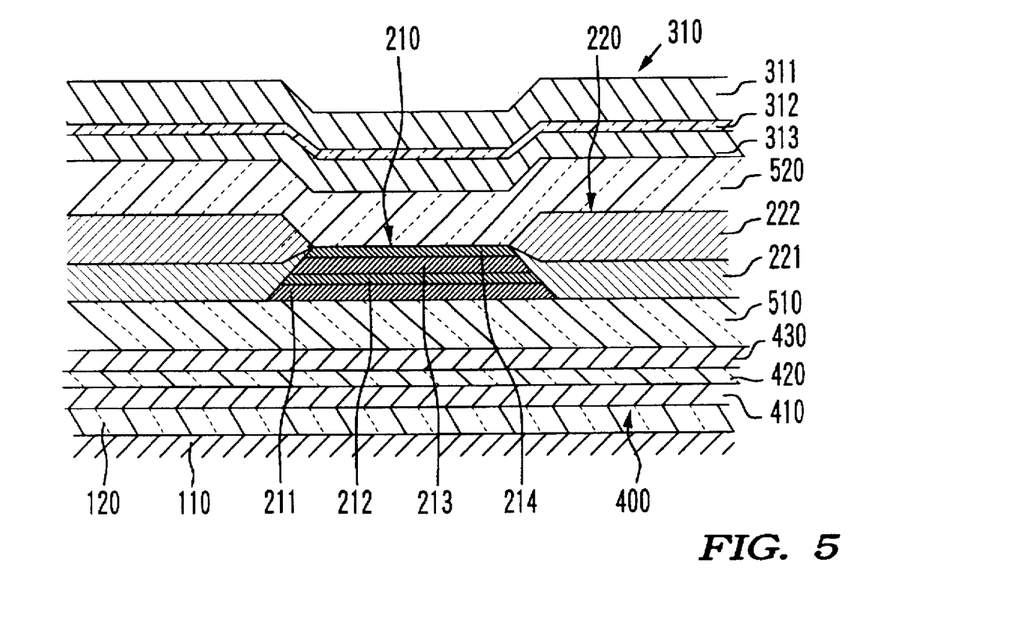
FIG. 5 is an enlarged cross section showing yet another example of an MR element which may be included in the magnetic head shown in FIG. 1.

FIG. 5 is a cross section showing another embodiment of the magnetic head according to the present invention. The same reference numbers are assigned to components that are identical to those shown in FIGS. 1 to 4 and their explanation is omitted. The embodiment shown in FIG. 5 represents a combination of the embodiment shown in FIG. 3 and the embodiment shown in FIG. 4. The first magnetic shield film 400 includes a magnetic film 410, a non-magnetic film 420 and a second magnetic film 430. The first magnetic film 410 and the second magnetic film 430 are separated from each other by the non-magnetic film 420. Of the magnetic films 410 and 430, the magnetic film 430, which is closer to the magnetic field response film 211, has a saturation magnetization that is lower than the saturation magnetization of the magnetic field response film 211.

The second magnetic shield film 310, which also constitutes the first magnetic film (lower magnetic film) of the inductive element 300, includes a magnetic film 311, a non-magnetic film 312 and a magnetic film 313, with the magnetic films 311 and 313 separated from each other by the non-magnetic film 312. Of the magnetic films 311 and 313, the magnetic film 313, which is closer to the magnetic field response film 211, has a saturation magnetization that is lower than the saturation magnetization of the magnetic field response film 211.

Figure 6:
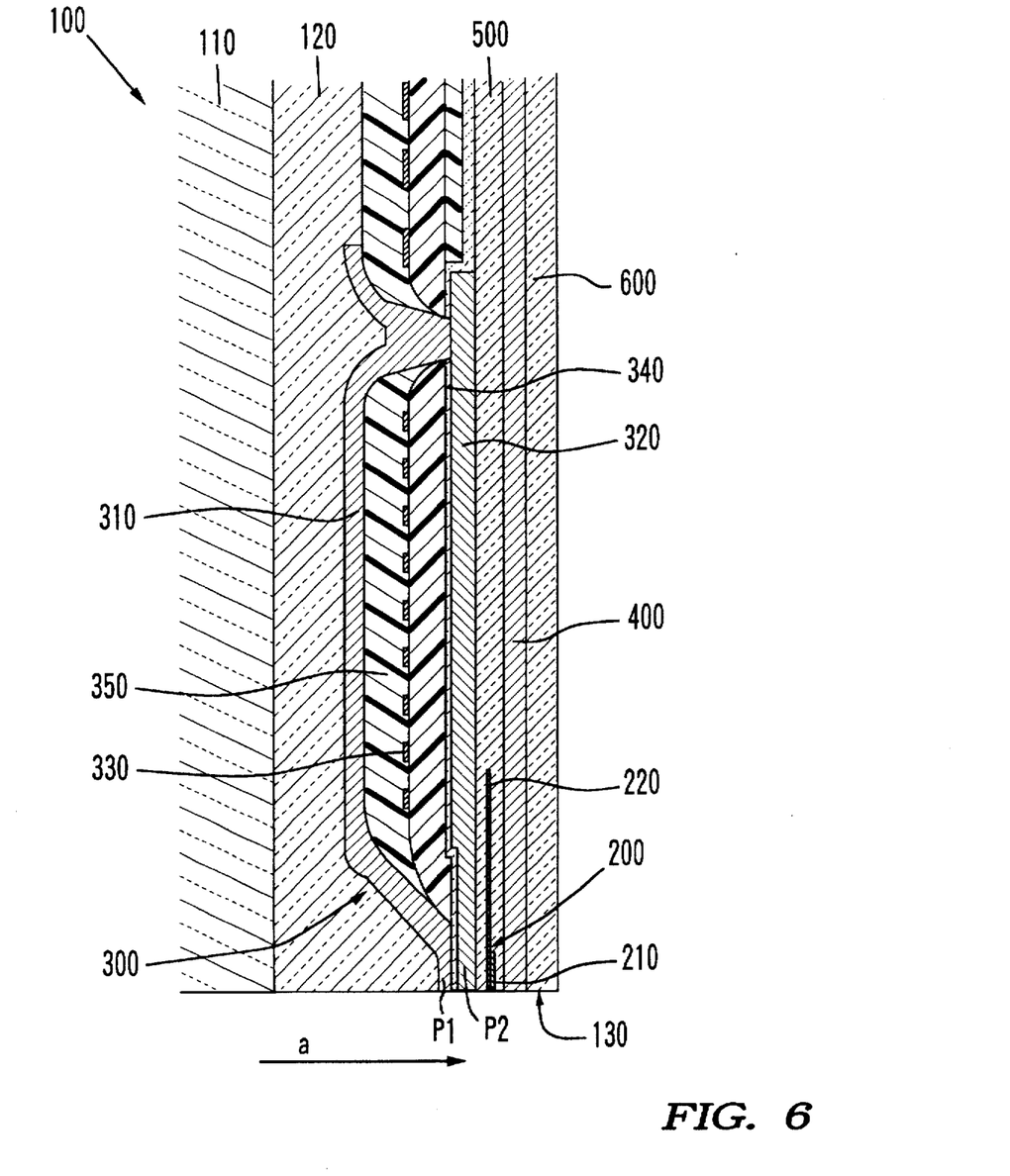
FIG. 6 is a cross section of another embodiment of the magnetic head according to the present invention.

FIG. 6 is a cross section showing another embodiment of the magnetic head according to the present invention. In the figure, the same reference numbers are assigned to components that are identical to those shown in FIG. 1. The feature of this embodiment is that the MR element 200 is laminated onto the inductive element 300. With such a structure, since the MR element 200 can be fabricated after the inductive element 300, the MR element 200 does not come under the influence of the heat treatment process which is an unavoidable part of the fabrication process in manufacturing the inductive element 300. The inductive element 300 is constituted by forming the first magnetic film (lower magnetic film) 310 within an indented portion formed in the insulating film 120 and then by forming the second magnetic film (upper magnetic film) 320, a coil film 330, the gap film 340 constituted of alumina or the like and the insulating film 350 constituted of an organic resin such as Novolak resin.

The MR element 200 uses the upper magnetic film 320 of the inductive element 300 as its second magnetic shield as film and has a structure in which an MR film 210 is provided on the insulating film 500 formed on the second magnetic shield film 320 and the first magnetic shield film 400 is laminated onto the insulating film 500. A protective film 600 is laminated onto the first magnetic shield film 400.

Figure 7:
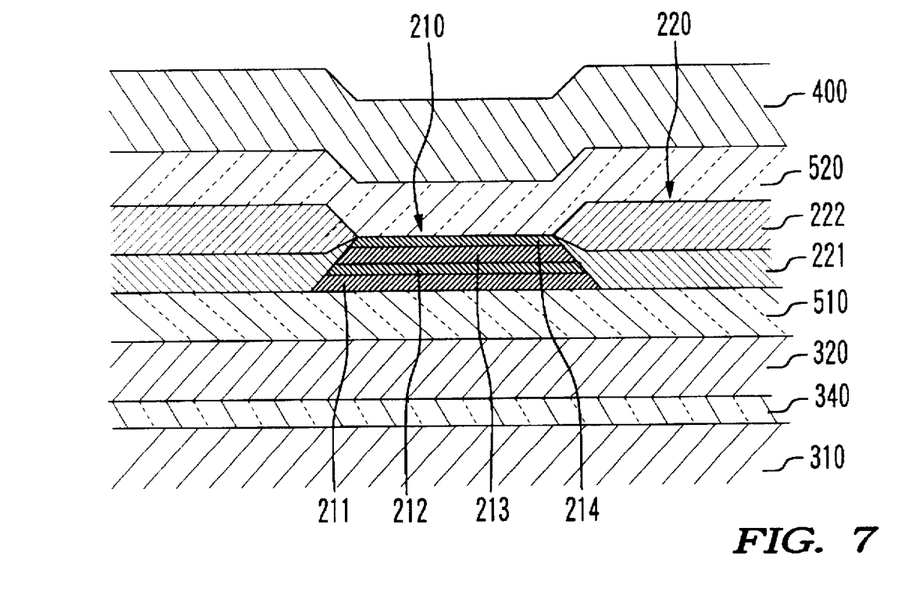
FIG. 7 is an enlarged cross section showing in detail the structure of an MR element which may be included in the magnetic head shown in FIG. 6.

FIG. 7 is an enlarged cross section showing the structure of the MR element 200 included in the thin film magnetic head shown in FIG. 6 in further detail. In the figure, the same reference numbers are assigned to components that are identical to those in FIGS. 1 to 6. In the embodiment, the MR film 210 is constituted of the spin valve film, which has been explained in reference to FIGS. 2 to 5. The first magnetic shield film 400 has a saturation magnetization that is lower than the saturation magnetization of the magnetic field response film 211. Such a first magnetic shield film 400 has already been explained.

Figure 8:
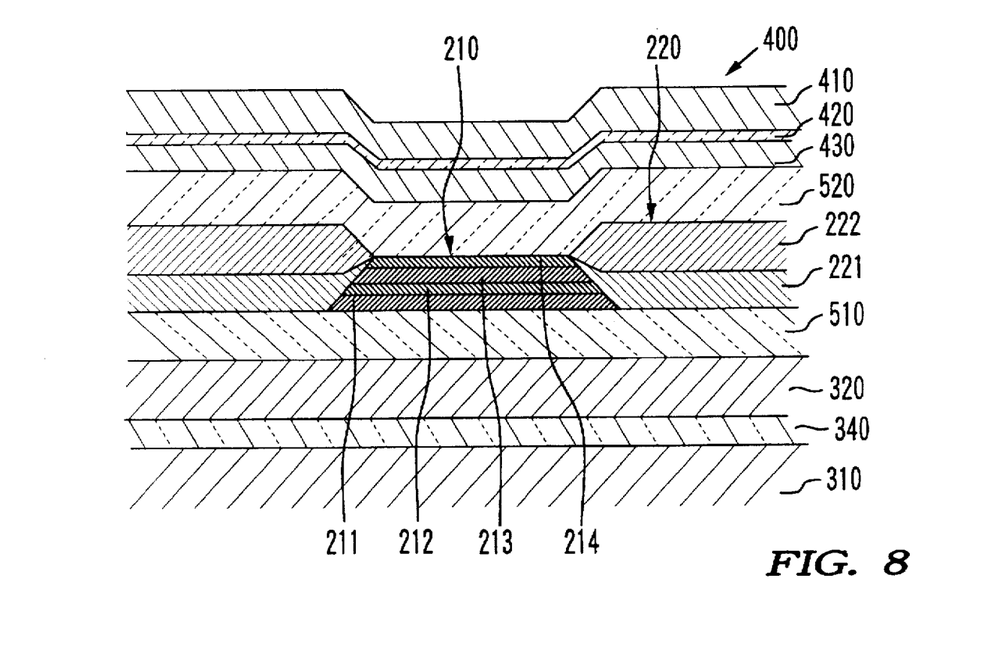
FIG. 8 is an enlarged cross section showing another example of an MR element which may be included in the magnetic head shown in FIG. 6.

FIG. 8 is a cross section showing another embodiment of the magnetic head according to the present invention. The first magnetic shield film 400 includes a magnetic film 410, a non-magnetic film 420 and a second magnetic film 430. The magnetic films 410 and 430 are separated by the non-magnetic film 420. Of the magnetic films 410 and 430, the magnetic film 430, which is closer to the magnetic field response film 211, has a saturation magnetization that is lower than the saturation magnetization of the magnetic field response film 211. The saturation magnetization of the magnetic film 410 may be either smaller or larger than the saturation magnetization of the magnetic field response film 211.

Figure 9:
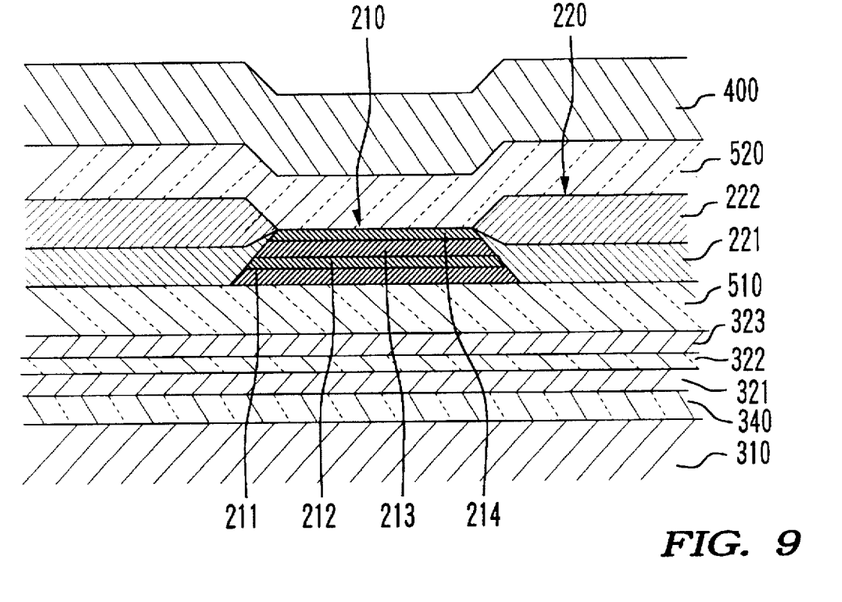
FIG. 9 is an enlarged cross section showing yet another example of an MR element which may be included in the magnetic head shown in FIG. 6.

FIG. 9 is a cross section showing another embodiment of the magnetic head according to the present invention. In the figure, the same reference numbers are assigned to components that are identical to those shown in FIGS. 1 to 8 and their explanation is omitted. The features of this embodiment are that the second magnetic shield film 320 constituting the upper magnetic film of the inductive element 300 includes a magnetic film 321, a non-magnetic film 322 and a magnetic film 323 and that the magnetic film 321 and the magnetic film 323 are separated from each other by the non-magnetic film 322. Of the magnetic films 321 and 323, the magnetic film 323, which is closer to the magnetic field response film 211, has a saturation magnetization that is lower than the saturation magnetization of the magnetic field response film 211. The saturation magnetization of the first magnetic shield film 400 is preferably smaller than the saturation magnetization of the magnetic field response film 211.

Figure 10:
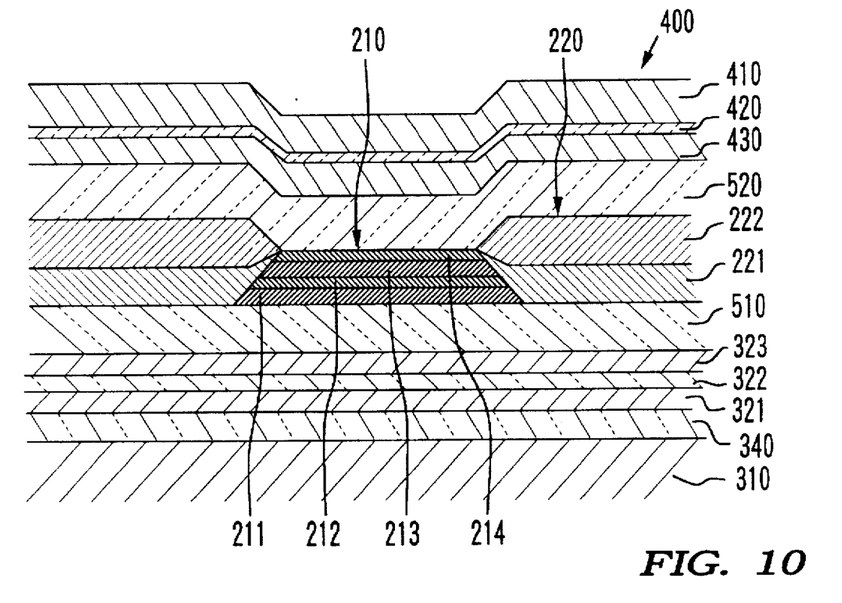
FIG. 10 is an enlarged cross section showing yet another example of an MR element which may be included in the magnetic head shown in FIG. 6.

FIG. 10 is a cross section showing another embodiment of the magnetic head according to the present invention. The same reference numbers are assigned to components that are identical to those shown in FIGS. 1 to 9 and their explanation is omitted. The embodiment shown in FIG. 10 represents a combination of the embodiment shown in FIG. 8 and the embodiment shown in FIG. 9. The first magnetic shield film 400 includes a magnetic film 410, a non-magnetic film 420 and a second magnetic film 430. The magnetic films 410 and 430 are separated from each other by the non-magnetic film 420. Of the magnetic films 410 and 430, the magnetic film 430, which is closer to the magnetic field response film 211, has a saturation magnetization that is lower than the saturation magnetization of the magnetic field response film 211.

The second magnetic shield film 321, which also constitutes the second magnetic film (upper magnetic film) of the inductive element 300, includes a magnetic film 321, a non-magnetic film 322 and a magnetic film 323, and the magnetic films 321 and 323 are separated from each other by the non-magnetic film 322. Of the magnetic films 321 and 323, the magnetic film 323, which is closer to the magnetic field response film 211, has a saturation magnetization that is lower than the saturation magnetization of the magnetic field response film 211.

The embodiments shown in FIGS. 6 to 10, too, achieve advantages similar to those achieved in the embodiments shown in FIGS. 1 to 5. Next, embodiments of the present invention including their manufacturing methods are explained.

Embodiment 1

In order to obtain the magnetic head shown in FIG. 2, the spin valve film, which constitutes the MR film 210, is formed through ion beam sputtering. The film formation is performed under the following conditions: with the ultimate vacuum at a maximum of $5\times10^{-5}$ Pa, the vacuum at the time of film formation at approximately $1.2\times10^{-2}$ Pa, the Ar gas flow rate at 7 sccm, the acceleration voltage of the sputter gun at 300 V and the ion current at 30 mA. It is to be noted that a magnetic field of approximately 100 Oe is applied when forming each film.

The film structure comprises Ta (0.05 μm)/Ni-Fe (0.1 μm)/Cu (0.025 μm)/Co (0.03 μm)/FeMn (0.1 μm)/Ta (0.05 μm). This film structure has been explained in detail in reference to FIG. 2. The MR change factor and the magnetic field sensitivity of the MR film thus obtained are 2.7% and 0.5%/Oe respectively. The second magnetic shield film 310 is constituted of a Ni-Fe alloy film formed through a plating method. It is a permalloy alloy with a composition of Ni-18Fe.

The first magnetic shield film 400 is formed through RF magnetron sputtering. The RF magnetron sputtering film formation is performed under the following conditions: the ultimate vacuum at a maximum of $1\times10^{-4}$ Pa, the vacuum at the time of film formation at approximately $4\times10^{-1}$ Pa, the Ar gas flow rate at 30 sccm and the RF power at 1000W. The relationships between the Ta content and the magnetic characteristics of the Ni-Fe-Ta film thus formed are shown in FIGS. 11 to 13.

Figure 11:
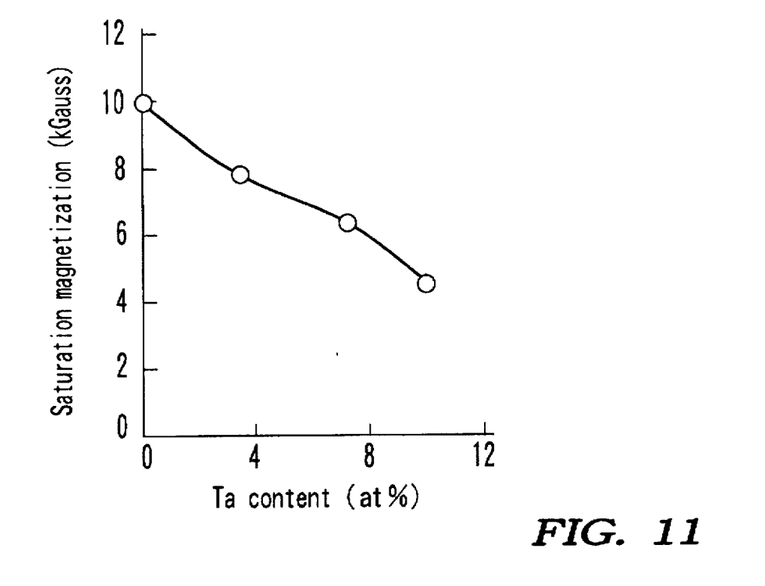
FIG. 11 is a graph illustrating the relationship between the Ta content in a Ni-Fe-Ta film and the saturation magnetization.

FIG. 11 is a graph illustrating the relationship between the Ta content and the saturation magnetization. FIG. 12 is a graph illustrating the relationship between the Ta content and the permeability and FIG. 13 is a graph illustrating the relationship between the Ta content and the coercivity. In FIGS. 11 to 13, the compositions are achieved with the Ta contents (at%) indicated in the figures and the Ni-18Fe alloy (permalloy).

First, in reference to FIG. 11, a reduction in the saturation magnetization is observed as the Ta content increases. Consequently, it is possible to control the saturation magnetization through adjustment of the Ta content.

Figure 12:
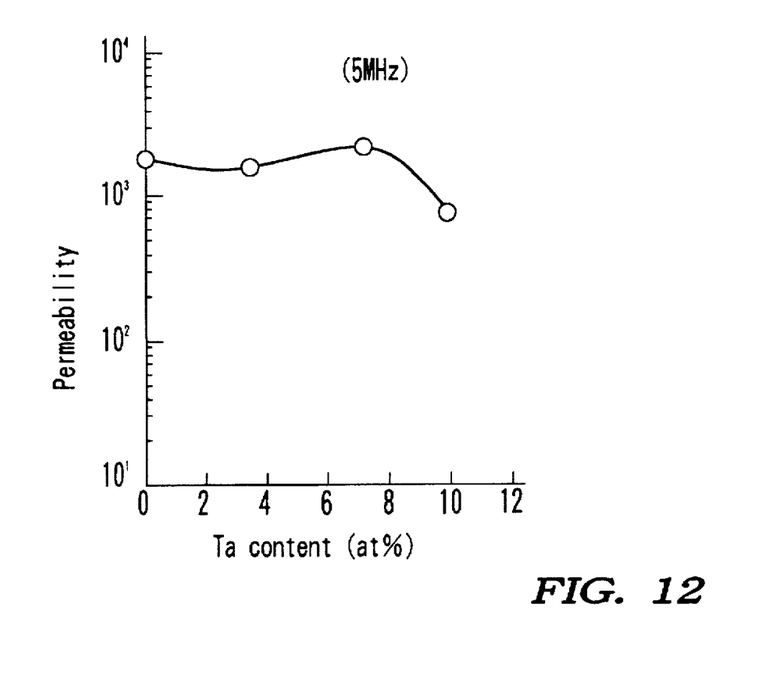
FIG. 12 is a graph illustrating the relationship between the Ta content in a Ni-Fe-Ta film and the permeability.
Figure 13:
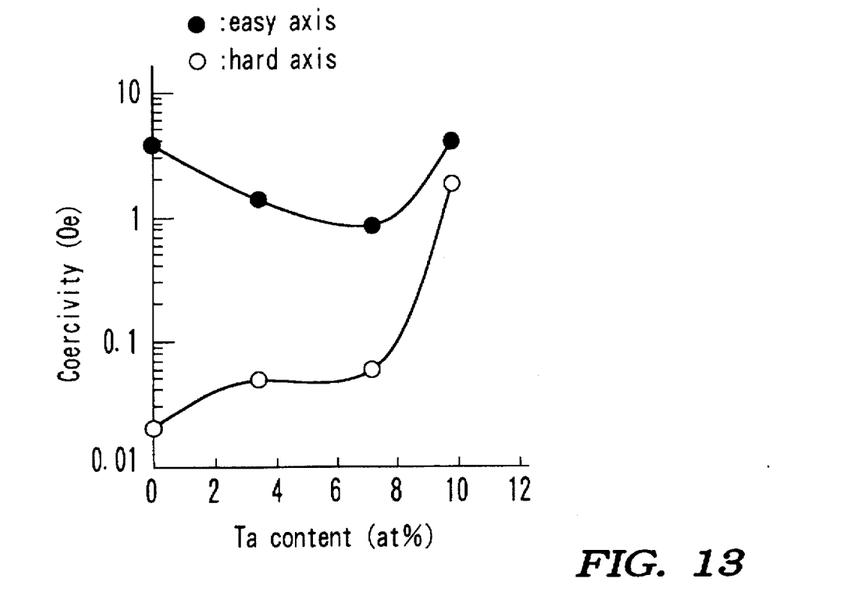
FIG. 13 is a graph illustrating the relationship between the Ta content in a Ni-Fe-Ta film and the coercivity.

Next, as shown in FIG. 12, a slight change in the permeability is observed in conformance to various Ta contents. As explained earlier, if the permeability becomes excessively small, the function of the magnetic shield film is not entirely fulfilled resulting in an increase in the PW50 of the output reproduction wave. For this reason, the Ta content is selected at a value such that a relatively high permeability is achieved while, at the same time, the saturation magnetization stays within a low range in conformance to the teachings learned in FIGS. 11 and 12.

As for the coercivity, it tends to increase as the Ta content increases, as shown in FIG. 13. This is not a desirable tendency for a magnetic shield. However, this does not present any problems whatsoever in practical use.

Table I shows the magnetic characteristics of a Ni-18Fe alloy and an Fe-Al-Si alloy, which are normally used for shields for the purpose of comparison. All the films have a film thickness of 1 μm and, in order to make a valid comparison, they are all formed through RF magnetron sputtering. The composition of the Fe-Al-Si alloy in this example has an atomic ratio of Fe:Al:Si=86:5:9.

TABLE I

| Shield film material | Saturation magnetization (KG) | Permeability (5 MHz) |
| --- | --- | --- |
| Ni—Fe—Ta | 6.4 | 2200 |
| Ni—Fe (example for comparison) | 10.0 | 1800 |
| Fe—Al—Si (example for comparison) | 11.0 | 2000 |

In this embodiment, a (Ni-18Fe)–7.2Ta alloy film whose permeability is slightly larger and whose saturation magnetization is lower than the Ni-18Fe alloy which constitutes the magnetic field response film 211 of the spin valve film, is used to constitute the first magnetic shield film 400. It is to be noted that a heat treatment is performed on this film at 300° C. at 3kOe for two hours.

Table II shows the output voltages and the PW50 of the output voltage waveforms of magnetic heads employing the Ni-Fe-Ta alloy film as in the embodiment, a Ni-Fe alloy and an Fe-Al-Si alloy to constitute the first magnetic shield film 400. The measurements were made under identical conditions, with the MR height at 1.0 μm, the track width at 2.5 μm, the resistance between electrodes at 40Ω, the sense current at 8 mA and the flying height at 75 nm.

TABLE II

| Shield film material | Output voltage (μ Vp – p) | PW50 (nm) |
| --- | --- | --- |
| Ni—Fe—Ta | 950 | 380 |
| Ni—Fe (example for comparison) | 700 | 380 |
| Fe—Al—Si (example for comparison) | 650 | 375 |

The results shown in FIG. 2 indicate that by using a Ni-Fe-Ta alloy film whose saturation magnetization is lower than that of the Ni-Fe alloy, at less than 10 kGauss, to constitute the first magnetic shield film 400, the influence of the static magnetic field imparted by the first magnetic shield film 400 to the magnetic field response film 211 of the spin valve film can be reduced, resulting in an improvement in the output voltage. In addition, it is verified that no significant difference is observed in the PW50 of the output reproduction waveform regardless of which material is used to constitute the first magnetic shield film, confirming that its function as a magnetic shield film is fulfilled.

It is to be noted that since, if the material used to constitute the first magnetic shield film 400 has an extremely small saturation magnetization and an extremely small permeability, its function as a magnetic shield film will naturally not be entirely fulfilled resulting in an increase in the PW50 of the output reproduction waveform. Thus, it is necessary to select a material which achieves an improvement in the output voltage without increasing the PW50, as in this embodiment.

Embodiment 2

In order to obtain the magnetic head shown in FIG. 3, a spin valve film identical to that used embodiment 1 is employed to constitute the MR film 210 and, likewise, a Ni-Fe alloy identical to that used in embodiment 1 is employed to constitute the second magnetic shield film 310. In the first magnetic shield film, the magnetic film 410 and the magnetic film 430 are separated from each other by the non-magnetic film 420, and the saturation magnetization of the magnetic film 430 which is closer to the magnetic field response film 211 of the spin valve film is lower than the saturation magnetization of the magnetic field response film 211.

The film structure comprising the magnetic film 410/non-magnetic film 420/magnetic film 430 is constituted of Ni-Fe-Ta alloy (0.5 μm)/Ta (0.3 μm)/Ni-Fe-Ta alloy (0.5 μm). The Ni-Fe-Ta alloy is a material that achieves a low saturation magnetization, as explained above, and its composition has an atomic ratio of (Ni-18Fe)–7.2Ta.

As an example for comparison, a magnetic head provided with a first magnetic shield film 400 constituted of a single layer film formed of an Fe-Al-Si alloy was prepared. The Fe-Al-Si alloy is normally used to constitute the lower shield.

Table III shows the output fluctuation and the output voltage of magnetic heads employing the first magnetic shield films described above. The measurements were made under identical measuring conditions as those in embodiment 1.

TABLE III

| Shield film material | Output fluctuation (example for comparison) | Output voltage (example for comparison) |
| --- | --- | --- |
| Ni—Fe—Ta two layers | 0.4 | 1.2 |
| Fe—Al—Si single layer (example for comparison) | 1 | 1 |

The results shown in Table III confirm that when a Ni-Fe-Ta alloy with a small saturation magnetization is used to constitute the first magnetic shield film, an improvement in the output voltage is achieved in addition to achieving a reduction in the output fluctuation.

Similar results are achieved even when the Ta in the Ni-Fe-Ta film is replaced by another element such as Cr, Hf, Rh or the like. This point is explained below.

Figure 14:
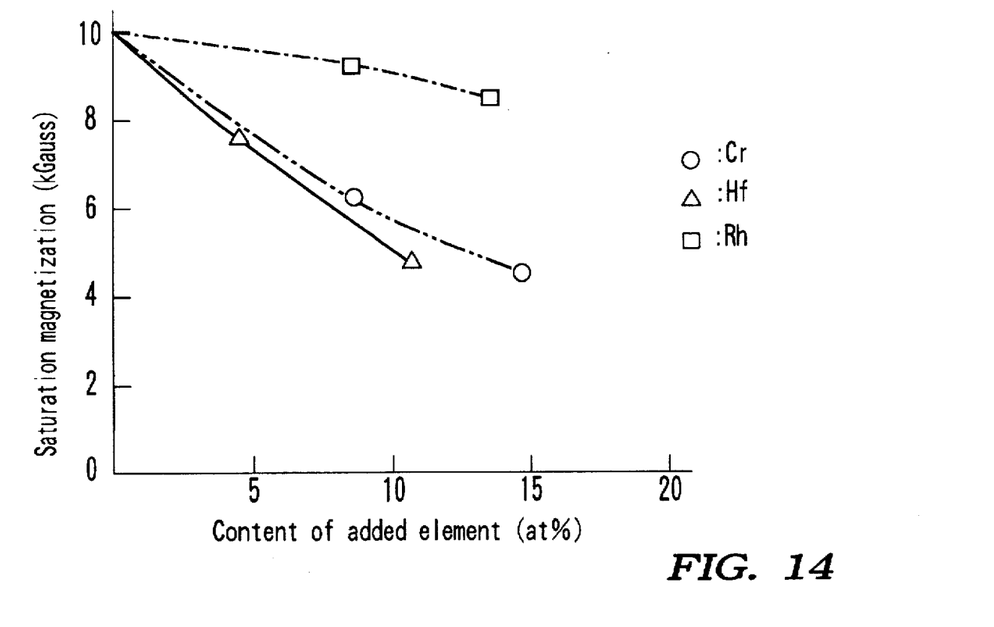
FIG. 14 is a graph illustrating the relationships between the Cr content in a Ni-Fe-Cr film, the Hf content in a Ni-Fe-Hf film and the Rh content in a Ni-Fe-Rh film, and the saturation magnetization.
Figure 15:
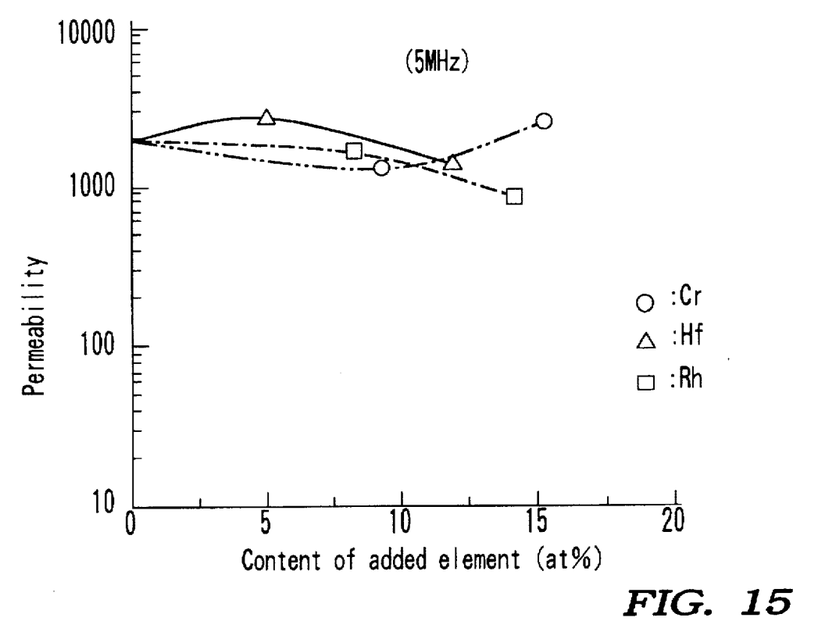
FIG. 15 is a graph illustrating the relationships between the Cr content in a Ni-Fe-Cr film, the Hf content in a Ni-Fe-Hf film and the Rh content in a Ni-Fe-Rh film, and the saturation permeability.
Figure 16:
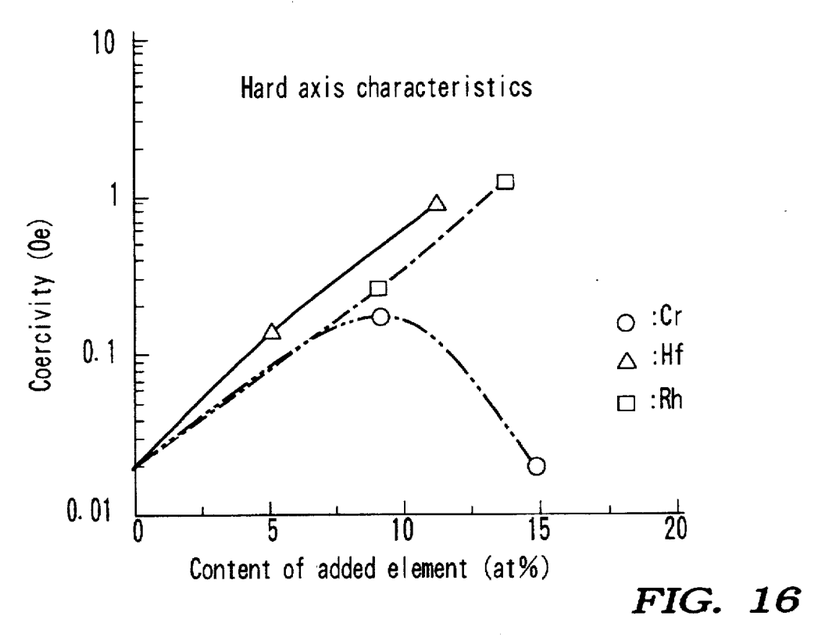
FIG. 16 is a graph illustrating the relationships between the Cr content in a Ni-Fe-Cr film, the Hf content in a Ni-Fe-Hf film and the Rh content in a Ni-Fe-Rh film and the coercivity.

FIG. 14 is a graph illustrating the relationships between the Cr content in a Ni-Fe-Cr film, the Hf content in a Ni-Fe-Hf film and the Rh content in a Ni-Fe-Rh film and the saturation magnetization, FIG. 15 is a graph illustrating the relationships between the Cr content in the Ni-Fe-Cr film, the Hf content in a Ni-Fe-Hf film and the Rh content in a Ni-Fe-Rh film and the permeability and FIG. 16 is a graph illustrating the relationships between the Cr content in a Ni-Fe-Cr film, the Hf content in a Ni-Fe-Hf film and the Rh content in a Ni-Fe-Rh film and the coercivity.

In FIGS. 14 to 16, the horizontal axis represents the content (at%) of Cr, Hf or Rh that is added with the remaining percentage accounted for by the Ni- 18Fe alloy (permalloy).

As shown in FIG. 14, a reduction in the saturation magnetization is observed as the Cr, Hf or Rh content increases regardless of which element is added. This confirms that the saturation magnetization can be controlled by adjusting the content of Cr, Hf or Rh.

In addition, as shown in FIG. 15, a slight change in the permeability is observed depending upon the varying Ta contents. However, this change remains within a range that ensures that no problem in practical use is caused.

As for the coercivity, it tends to increase as the Hf or Rh content increases, as shown in FIG. 16. With Cr, a desirable outcome, in which the coercivity is drastically reduced when the Cr content exceeds 10 at%, is achieved.

While the invention has been particularly shown and described with reference to preferred embodiment thereof, it will be understood by those skilled in the art that various changes in form and detail may be made therein without departing from the spirit, scope and teaching of the invention.

What is claimed is:

1. A magnetic head including a magnetoresistive conversion element, said magnetoresistive conversion element comprising:
   a magnetoresistive film including at least one magnetic field response film that responds to an external magnetic field; and
   a first magnetic shield film and a second magnetic shield film being positioned at either side of said magnetoresistive film, wherein at least either said first magnetic shield film or said second magnetic shield film includes a magnetic film whose saturation magnetization is lower than a saturation magnetization of the magnetic field response film and said magnetic film occupies a position in said magnetic shield filmthat is close to said magnetic field response film.

2. A magnetic head according to claim 1, wherein:
   either said first magnetic shield film or said second magnetic shield film includes a non-magnetic film, a first magnetic film and a second magnetic film, with said first magnetic film and said second magnetic film being separated from each other by said non-magnetic film; and
   of said first magnetic film and said second magnetic film, a magnetic film that is positioned closer to said magnetic field response film has a saturation magnetization lower than said saturation magnetization of said magnetic field response film.

3. A magnetic head according to claim 2, wherein:
   said saturation magnetization of said magnetic film positioned closer to said magnetic field response film is less than 10 kGauss.

4. A magnetic head according to claim 2, wherein:
   of said first magnetic film and said second magnetic film, a magnetic film positioned further away from said magnetic field response film has a saturation magnetization lower than said saturation magnetization of said magnetic field response film.

5. A magnetic head according to claim 4, wherein:
   said saturation magnetization of said magnetic film positioned further away from said magnetic field response film is less than 10 kGauss.

6. A magnetic head according to claim 2, wherein:
   a magnetic film positioned further away from said magnetic field response film has a saturation magnetization higher than said saturation magnetization of said magnetic field response film.

7. A magnetic head according to claim 1, wherein:
   said magnetoresistive film is constituted of a spin valve film.

8. A magnetic head according to claim 7, wherein:
   said spin valve film comprises, at least, said magnetic field response film, a non-magnetic film, a pinned ferromagnetic film and an anti-ferromagnetic film; said magnetic field response film and said pinned ferromagnetic film are separated from each other by said non magnetic film; and
   said anti-ferromagnetic film is coupled to said pinned ferromagnetic film.

9. A magnetic head according to claim 1, including an inductive conversion element.

10. A magnetic head according to claim 9, wherein:
    said inductive conversion element is provided adjacent to said magnetoresistive conversion element.

11. A magnetic head according to claim 10, wherein:
    either said first magnetic shield film or said second magnetic shield film is also utilized as a magnetic film of said inductive conversion element.

12. A magnetic head according to claim 11, wherein:
    of said first magnetic shield film and said second magnetic shield film, a magnetic shield film that is not utilized as said magnetic film of said inductive conversion element includes a non-magnetic layer, a first magnetic film and a second magnetic film with said first magnetic film and said second magnetic film being separated from each other by said non-magnetic film; and
    of said first magnetic film and said second magnetic film, a magnetic film that is positioned closer to said magnetic field response film has a saturation magnetization that is lower than a saturation magnetization of said magnetic field response film.

13. A magnetic head according to claim 12, wherein:
    said saturation magnetization of said magnetic film positioned closer to said magnetic field response film is less than 10 kGauss.

14. A magnetic head according to claim 12, wherein:
    of said first magnetic film and said second magnetic film, a magnetic film positioned further away from said magnetic field response film has a saturation magnetization lower than said saturation magnetization of said magnetic field response film.

15. A magnetic head according to claim 14, wherein:
    said saturation magnetization of said magnetic film positioned further away from said magnetic field response film is less than 10 kGauss.

16. A magnetic head according to claim 12, wherein:
    a magnetic film positioned further away from said magnetic field response film has a saturation magnetization higher than said saturation magnetization of said magnetic field response film.

17. A magnetic head according to claim 11, wherein:
    of said first magnetic shield film and said second magnetic shield film, a magnetic shield film that is also utilized as said magnetic film of said inductive conversion element includes a non-magnetic layer, a first magnetic film and a second magnetic film with said first magnetic film and said second magnetic film being separated from each other by said non-magnetic film; and
    of said first magnetic film and said second magnetic film, a magnetic film that is positioned closer to said magnetic field response film has a saturation magnetization that is lower than a saturation magnetization of said magnetic field response film.

18. A magnetic head according to claim 17, wherein:
    said saturation magnetization of said magnetic film positioned closer to said magnetic field response film is less than 10 kGauss.

19. A magnetic head according to claim 17, wherein:
    of said first magnetic film and said second magnetic film, a magnetic film positioned further away from said magnetic field response film has a saturation magnetization lower than said saturation magnetization of said magnetic field response film.

20. A magnetic head according to claim 19, wherein:
said saturation magnetization of said magnetic film positioned further away from said magnetic field response film is less than 10 kGauss.

21. A magnetic head according to claim 17, wherein:
a magnetic film positioned further away from said magnetic field response film has a saturation magnetization higher than said saturation magnetization of said magnetic field response film.

\* \* \* \* \*